United States Patent
Willard et al.

(10) Patent No.: US 7,288,861 B1
(45) Date of Patent: Oct. 30, 2007

(54) INERTIAL ACTUATOR WITH MULTIPLE FLEXURE STACKS

(75) Inventors: Charles L. Willard, Agua Dulce, CA (US); Kenneth E. Pusl, Valencia, CA (US); Frederick T. Van Namen, Malden (NL)

(73) Assignee: Motran Industries Inc., Valencia, CA (US)

( * ) Notice: Subject to any disclaimer, the term of this patent is extended or adjusted under 35 U.S.C. 154(b) by 185 days.

(21) Appl. No.: 10/967,771

(22) Filed: Oct. 19, 2004

Related U.S. Application Data

(60) Provisional application No. 60/551,118, filed on Mar. 6, 2004.

(51) Int. Cl.
*H02K 33/00* (2006.01)

(52) U.S. Cl. .................... 310/15; 310/14; 310/36; 335/220

(58) Field of Classification Search .................. 310/36, 310/14, 15; 188/378, 379; 248/550; 267/140.14, 267/140.15; 335/220
See application file for complete search history.

(56) References Cited

U.S. PATENT DOCUMENTS

| | | | | | |
|---|---|---|---|---|---|
| 5,231,336 | A | * | 7/1993 | van Namen | 318/128 |
| 5,896,076 | A | * | 4/1999 | van Namen | 335/229 |
| 5,973,422 | A | * | 10/1999 | Clamme | 310/36 |
| 5,975,510 | A | * | 11/1999 | Miyazaki | 267/140.15 |
| 6,935,471 | B2 | * | 8/2005 | Noe | 188/378 |

* cited by examiner

*Primary Examiner*—Karl Tamai
(74) *Attorney, Agent, or Firm*—J. E. McTaggart

(57) ABSTRACT

An inertial actuator for active vibration control utilizes a single cylindrical actuator module of the "voice coil" type. A moving armature assembly, including a soft iron shell with a tubular sleeve coaxially surrounding a core with two permanent magnets and corresponding pole plates, is suspended compliantly by a flexure assembly including a multiple-stack array of shaped flexure strips and a pair of end support flexure plates mounted to a base. Two magnetically charged annular air gaps at the pole plates in the moving armature traverse two corresponding annular coils wound in a tubular bobbin that extends as a heat-sinking mounting column attached to the base. This form of inertial actuator provides cost benefits along with improved performance and reliability due to the stability of the moving parts and uniformity of linear motion.

2 Claims, 3 Drawing Sheets

INERTIAL ACTUATOR WITH MULTIPLE FLEXURE STACKS

PRIORITY

Benefit is claimed under 35 U.S.C. § 119(e) of pending provisional application 60/551,118 filed Mar. 6, 2004.

FIELD OF THE INVENTION

The present invention relates to the field of inertial electromagnetic actuators with permanent magnets, especially as related to the field of active vibration control, and discloses an actuator that can be directed beneficially to powered vehicles, e.g. in aeronautic and space travel.

BACKGROUND OF THE INVENTION

Actuators for active vibration control can be realized utilizing hydraulic, pneumatic or electromagnetic implementation. Electromagnetic actuators commonly utilize moving armatures in configurations whose operating principles are characterized by large variations in magnetic air gap dimensions and consequent large variations in flux density in the air gap which, due to eddy currents and other harmful effects, limit efficiency and available stroke amplitude.

However a special category of electromagnetic actuator works on the principle of a loudspeaker voice coil moving in a small air gap of constant dimensions in which the flux density, typically from a permanent magnet, remains substantially constant, providing substantial design advantages.

The combination of voice coil type actuator and flat spring flexures has potential for providing the following advantages:

1. Maximized volumetric utilization with minimum mass requirements.
2. Capability to accommodate multiple actuator modules in parallel, where the stationary coils are mounted on a common base and the armatures containing the magnet structure(s) are connected to a common flexure pack so that high width to depth ratios are possible.
3. The active mass ratio is maximized because the shell is included in the armature structure.
4. Flexures allow longer stroke than coil springs.
5. A greater diversity of materials including composites is possible with flexures rather than coil springs.
6. Flexures allow much higher spring rates per unit is volume than coil springs.
7. The support flexure element accommodates the dynamic change in length of the working flexure element, locates the inertial mass, and transmits the inertial forces to the base in a minimum of space and minimum mass.
8. The coil assembly can benefit from improved thermal bonding to the base and forced cooling can be designed into the system.

When a voice coil type actuator is used in a small range of frequencies it is common practice to add springs to the arrangement in order for the armature to operate at or just below resonance. Resonance provides a means to create a force gain and reduces the power input required, but the amplitude of the armature does not change as a function of resonance. The amplitude of the armature is proportional to the output force of the actuator, not the input (coil) force.

Higher output force requires a longer actuator to accommodate longer stroke, or an actuator with a large diameter to accommodate additional inertial mass. Lower operating frequency also requires longer stroke, which requires very long springs, adding to the bulk of the actuator and reducing the ratio of active mass to total mass. The increased dimensions and mass of such actuators make them often unsuitable for applications such as helicopters

DISCUSSION OF KNOWN ART

An example of the use of the voice coil principle in an actuator for active vibration control is disclosed in U.S. Pat. No. 5,231,336 to F. T. van Namen.

One known form of inertial actuator for vibration control where a long stroke is required utilizes one or more coil springs as a compliant element in the suspension system.

As an alternative, compliance can be provided by the use of substantially flat leaf springs known as flexures or flexure strips, which may be shaped with width and/or thickness variations rather than in a uniform strip form to control the compliance, mass and stress parameters.

In FIGS. 1-3 is shown three views of an actuator utilizing the permanent-magnet/voice-coil principle as has been known and used in conjunction with suspension flexures in actuators for active vibration control in helicopters in a two-module configuration, A non-moving stator portion, intended to be attached to a massive region of a host machine for vibration suppression, typically a motorized vehicle, includes a pair of tubular bobbins 10A of which the bottom ends are seen in FIG. 2 located beneath associated actuator modules 10, coupled directly to the base casting 12. Each bobbin 10A carries a pair of annular voice coils located inside the shells of actuator modules 10, and the lower portion of the bobbins serve to conduct heat from the coils to the base casting 12, which thus serves as a heat sink.

A moving armature portion of the actuator module includes a tubular ferrous shell around each actuator module 10, two permanent magnets, with circular polepieces, forming a cylindrical core located concentrically inside each actuator module 10, an end piece 10B linking the core mechanically and magnetically to the shell sleeve, and an auxiliary mass 14, connecting the movable armature portion to a vibratable central region of the single overhead stack 16 of flexure strips, which is supported at each end by a vertical flexure 18 extending down and attached to a corresponding end of the base casting 12. Auxiliary mass 14 is configured with the sloping contour as seen at the top to provide clearance to prevent unwanted contact with the bottom of flexure stack 16 as it bends when deflected upwardly during operational vibration.

The contour of each strip in the flexure stack 16 is seen in FIG. 1 to approximate the shape of a double hourglass, and as seen in FIG. 2, each "hourglass" half is located above a corresponding one of the two actuator modules 10.

The vertical flexure plates 18 are also configured in the hourglass shape as seen in FIG. 3. Flexure strips and end plates can be varied in quantity and contoured in both width and thickness for desired compliance, mass, reduction of stress, and influence on resonance frequency.

OBJECTS OF THE INVENTION

It is a primary object of the present invention to provide an improved structure in an inertial electro-magnetic actuator for active vibration control to accomplish increased overall operational efficiency and more uniform motion control in a cost-effective manner.

It is a further object to provide improvements in an inertial electromagnetic structure that utilizes a known and proven magnet and coil bobbin configuration.

It is a further object to provide an improved flexure system that operates under lower and more uniformly distributed stress.

It is further object to minimize the total mass of the inertial actuator, as required for aeronautical use.

SUMMARY OF THE INVENTION

The foregoing objects have been met in the structure of an inertial actuator by novel overall configuration utilizing only a single actuator module providing the benefits of lower cost along with improved performance and reliability due to better uniformity and stability of moving parts, and by configuring a flexure assembly with multiple stacks of flexure strips, yielding advantages of lower mass and lower, more uniformly distributed stress.

From a design viewpoint, a flexure assembly configured as an array containing a multiplicity of stacks of flexure strips provides freedom to select optimal quantities of stacks in the array and strips in the stack for optimum span to width ratios which along with optimal strip shaping can accommodate the most challenging envelope requirements.

DETAILED DESCRIPTION OF THE INVENTION

Figure 1:
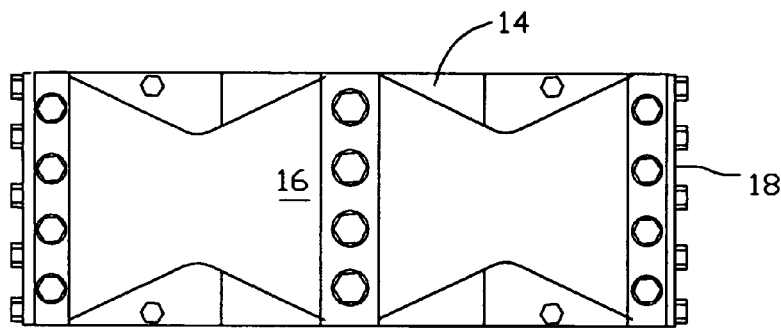
FIGS. 1, 2 and 3 are three views of a prior art inertial actuator for active vibration control configured with two actuator modules whose moving armature portions are suspended by a single stack of flexure strips.

It is to be understood that terms herein indicating direction such as "up"#, "down", "horizontal" and "vertical" are used in an arbitrary manner for purposes of facilitating descriptions in connection with the drawings showing the base at the bottom, whereas in actual deployment, e.g. on a helicopter, the actuator may be oriented in another designated direction other than the reference horizontal direction of the base shown in the drawings.

Figure 2:
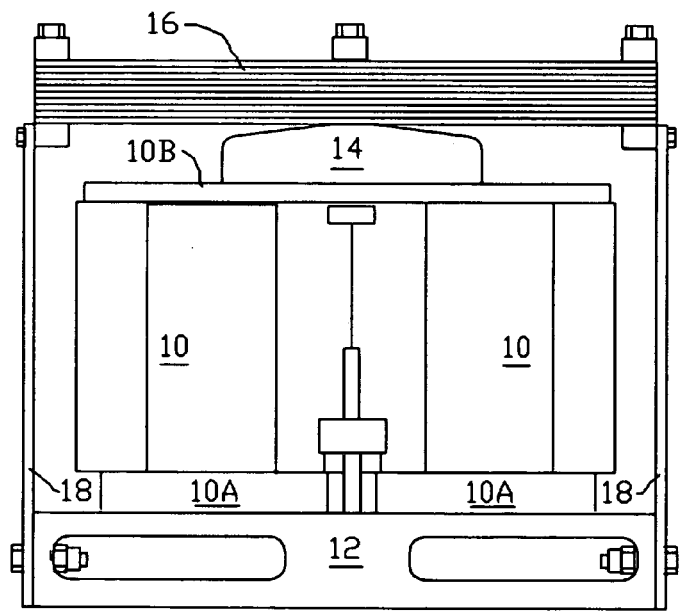
Figure 3:
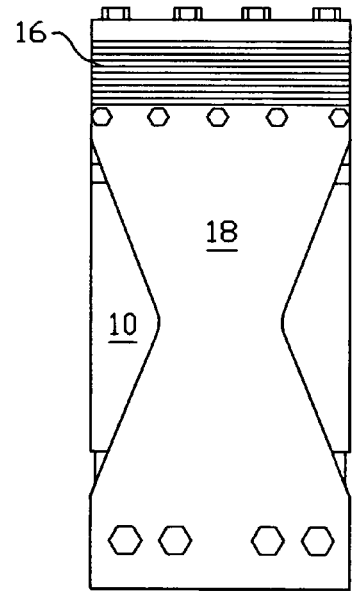

FIGS. 1, 2 and 3 are three views of an inertial actuator for active vibration control of known art as discussed above.

Figure 4:
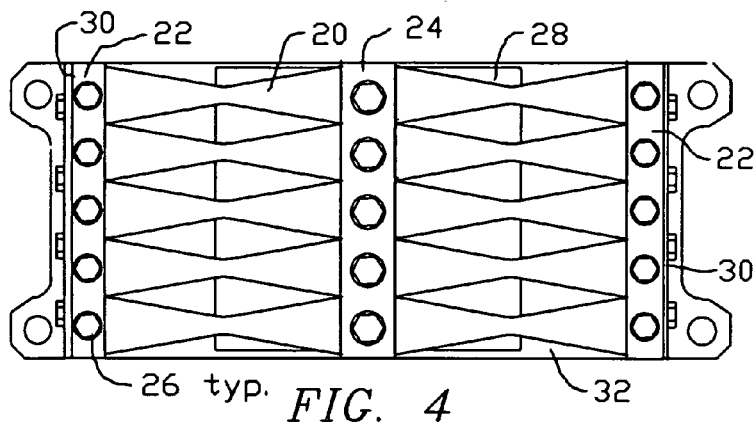
FIG. 4 is a top view of an inertial actuator in accordance with the present invention configured with a single actuator module whose moving armature portion is suspended by a multiple stack flexure assembly.

In FIG. 4, a top view of an actuator in accordance with the present invention, compliant suspension for the moving armature portion of a single actuator module is provided by a multiple array of five stacks 20 of flexure strips as shown. The flexure stacks 20 are clamped down at both ends by clamp bar 22 and across the center by clamp bar 24. Clamp bars 22 and 24 are tightened down onto the ends of the stacked flexure stacks 20 by bolts 26 extending down through holes in clamp bars 22 and 24 and through holes in the flexure strips of stacks 20. The outline of a rectangular shell yoke plate 28 appears in the gaps between stacked flexure stacks 20. A vertical end support flexure 30 is seen at each end. The overall outline is that of base 32 with mounting lugs extending from each end as shown. Base 32 may be fabricated as a casting or machined part, typically of aluminum.

Figure 5:
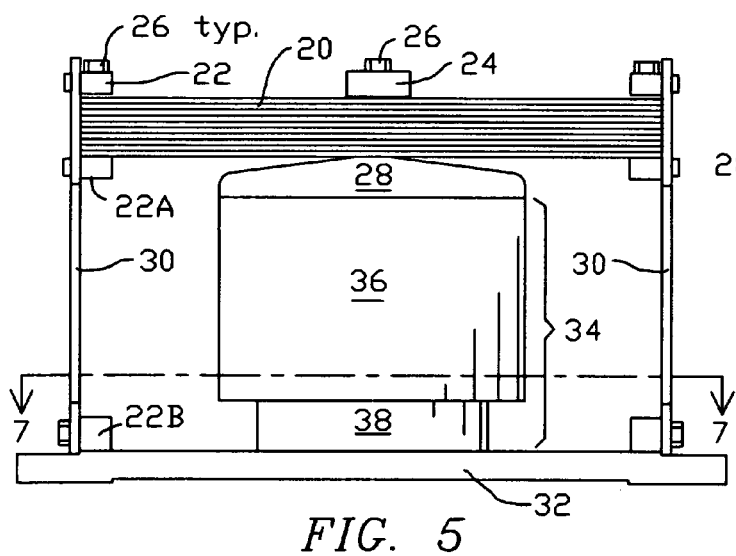
FIG. 5 is a front view of the subject matter of FIG. 4 showing the single actuator module.

In FIG. 5, the front view of the inertial actuator of FIG. 4, at each end of the array of five flexure stacks 20, a set of five bolts 26, traversing clamp bars 22, threadedly engage a lower clamp bar 22A which is bolted to the top end of a corresponding vertical end support flexure plate 30 whose lower end is fastened to base 32 via bars 22B. At the center of the array of stacks 20, five bolts 26 traverse clamp bar 24 and five corresponding stacks 20, and threadedly engage shell yoke plate 28 which is attached to the top of tubular shell sleeve 36 forming the outwardly visible portion of the moving armature mass portion of actuator module 34. The fixed stator mass portion of actuator module 34 includes a tubular bobbin 38, mainly surrounded by shell sleeve 36, whose lower portion is seen extending down to base 32 where the bottom end of bobbin 38 is securely fastened.

The moving armature mass portion of actuator module 34 includes shell sleeve 36 which is magnetically and mechanically linked at the top end by yoke plate 28 to an internal magnetic core assembly not visible in this view. The moving armature mass portion is suspended by the flexure assembly: an array of five compliant stacks 20 of flexure strips. Mechanical resonance occurs at a frequency determined by the mass of the moving armature portion and the compliance of the flexure assembly of stacks 20. The resonant frequency can be adjusted by changing the mass of the moving armature portion, e.g. by selecting the thickness of yoke plate 28, and/or by varying its shape which can be made rectangular as shown (FIG. 4) or circular. Also additional mass may be added either on top of the array of stacks 20 or beneath the array, on top of yoke plate 28.

Under vibration, vertical displacement at the center of each flexure stack 20, which can range up to a predetermined armature travel limit for which the actuator module is designed, creates an S-bend in each half of the stacks 20 while flexing. The resultant dynamic change in length of the stacks 20 is accommodated by flexing of the two resilient vertical end support flexure plates 30 which locate the inertial mass of the moving armature portion, and which transmit the inertial forces to the base 32 in an overall minimum of space and minimum mass in the inertial actuator.

The end plates 18 vibrate in opposite horizontal directions at twice the frequency of the vertical vibration of the array of stacks 20 as they flex, however unwanted horizontal vibration in the array of stacks 20 (and thus in the moving armature mass portion) is avoided by cancellation due to structural balance of the overall flexure assembly.

The parameters of end plates 18 are selected for minimal influence on the desired vertical vibration of the moving armature assembly including the array of stacks 20.

The flexure strips in each stack 20 may made from a spring grade of metal or from a composite including materials such as carbon fibers and resin, Thickness of the individual flexure strips in stack 20, and the quantity of strips in each stack 20, which typically can range between 6 and 58, and the number of flexure plates 30 at each end, which can be made one (as shown), two or more, are selected to obtain a desired degree of overall compliance, i.e. stiffness. To avoid unwanted noise, it is preferable to prevent contact between the strips (and end plates, if more than one at each end) under vibration by utilizing washers or other spacers in the mountings.

Figure 6:
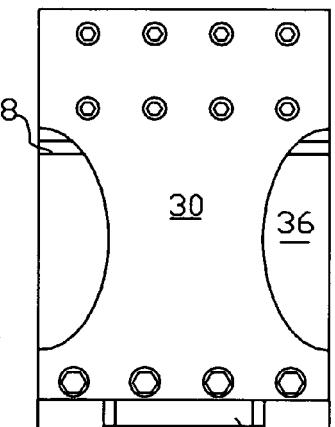
FIG. 6 is a side view of the subject matter of FIGS. 4 and 5 showing an end support flexure plate.

FIG. 6 is a side view of the actuator of FIGS. 4 and 5 showing the special contour of one of the two end support flexure plates 30, with mirror-image arched regions cut away at each side for optimal compliance and stress distribution. In this view, shell sleeve 36 and yoke plate 28 of the actuator module are seen extending approximately full width of the end support flexure plate 30.

The shape selected for the contour of the cutaway regions of flexure strips 20 and vertical end support flexures 30 is a matter of design choice: basically this contour affects compliance, stress distribution and, to some extent, mass. This contour can be selected from a range of shapes that includes the hour glass shape shown in FIG. 4 and the elliptical shape shown in FIG. 6. Thickness may be varied as well as width, and accordingly, the number of strips per stack 20, as well as the number of stacks 20 in the overall flexure assembly, to optimize for particular dimensional and operating parameters.

Figure 7:
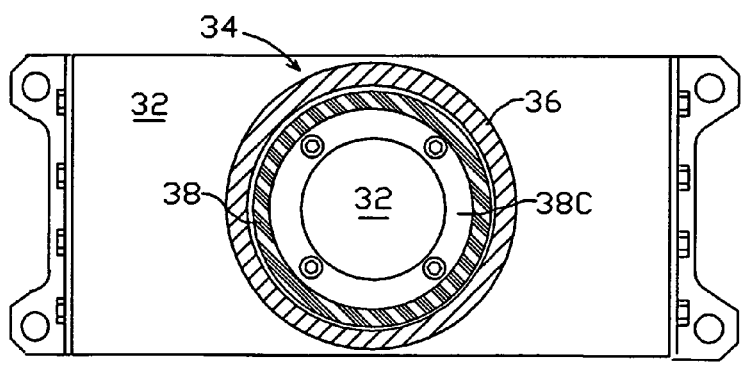
FIG. 7 is a cross-section taken at 7-7 of FIG. 5.

FIG. 7 is a horizontal cross-section of actuator module 34, taken through 7-7 of FIG. 5, showing the concentric arrangement of tubular soft iron shell sleeve 36 surrounding the tubular support region of bobbin 38 which is configured with an inward bottom flange 38C by which it is bolted to base 32, shown in the background, to serve as a heat sink.

Figure 8:
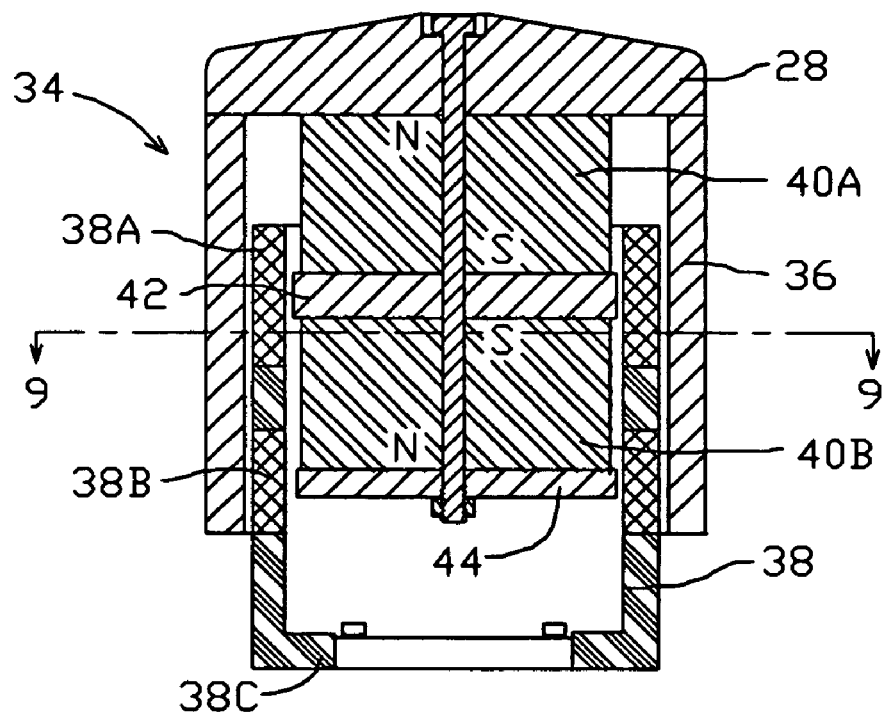
FIG. 8 is a vertical central cross-section of the actuator module of FIGS. 5-7.

FIG. 8 is a vertical cross-section through the central axis of actuator module 34 of FIG. 5. The movable armature mass portion includes a tubular shell sleeve 36 surrounding a cylindrical core assembly with two magnets 40A and 40B, a first poleplate 42 between the magnets and a second poleplate 44 interfacing the bottom side of lower magnet 40B. The two magnets 40A and 40B are arranged in mirror image relationship with regard to magnetic polarity as indicated: NS/SN, i.e. with two like poles interfacing on opposite sides of poleplate 42. Alternatively they could arranged SN/NS.

Soft iron shell yoke plate 28, attached onto the top end of magnet 40A and the top end of the shell sleeve 36, links the core assembly mechanically and magnetically to shell sleeve 36, providing the magnetic flux path for magnetic flux concentrations in the two annular air gaps at the periphery of circular poleplates 42 and 44. Centered about these two air gaps are two adjacent "voice" coils 38A and 38B each wound into bobbin 38 in corresponding coil winding compartments, each formed by reducing the outer diameter of bobbin 38 so as to leave only a thin inner wall in each compartment. When connected in aiding phase polarity and energized by alternating electric current at the desired frequency of vibration, coils 38A and 38B interact with the magnetic flux in the gaps, in accordance with the well known "right hand rule" to vibrate the entire magnetic armature portion in a vertical direction as enabled by flexing of the stacked flexure strips 20 and end support flexures 30 (FIGS. 4 and 5).

In order to maximize the efficiency of magnetic circuit it is important to keep the gap between the poleplates 42,44 and shell sleeve 36 to a minimum, and to keep the magnetic core structure concentric with the bobbin 38 and to keep the coils 38A and 38B centered radially in their magnetically-charged air gaps during their intended reciprocating vertical movement.

Coils 40A and 40B are dimensioned to provide a required range of vertical travel of the moving armature assembly with a predetermined margin of reserve. The interconnection of coils 40A and 40B can be in series or parallel. It is essential for the two coils to be interconnected in proper phase polarity, depending on the direction of each winding, such that the coils co-operate in an additive mode. Furthermore load-sharing of input power and drive forces must be taken into consideration in the design of coils 40A and 40B.

The configuration shown in FIG. 8 as a preferred embodiment using two coils 38A and 38B, and two magnets 40A and 40B, is considered optimal overall; however, the invention could be practiced utilizing the "voice coil" principle with only one magnet and one coil, i.e. with magnet 40B and coil 38B eliminated. Alternatively, the tandem arrangement of the two sections shown could be further extended to have three or more sections in which all of the magnets are oriented so as to place like magnetic poles interfacing on opposite sides of each intervening pole plate such as pole plate 42. Also each coil must be properly connected for proper additive phase polarity as discussed above in connection with the two coils 38A and 38B, e.g. for three magnets, the polarity sequences could be NS/SN/NS or the reverse SN/NS/SN.

Figure 9:
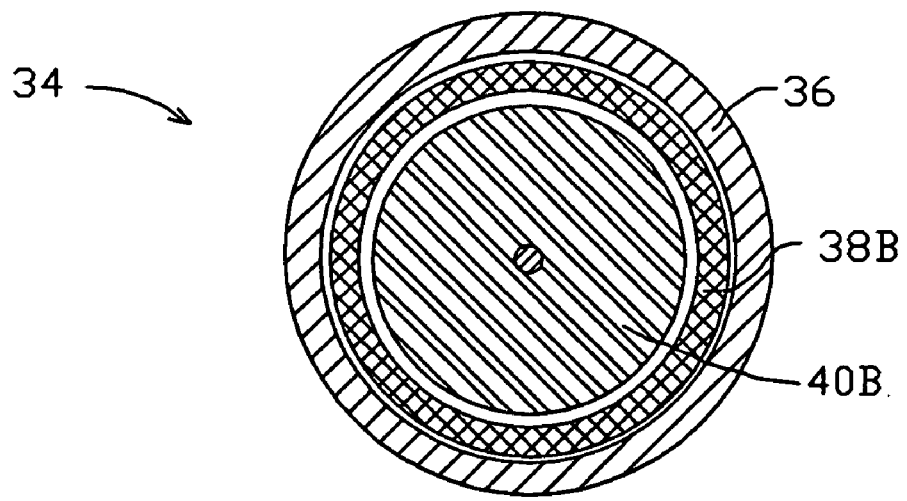
FIG. 9 is a cross-section taken at 9-9 of FIG. 8.

FIG. 9 is a horizontal cross-section of actuator module 34 taken through 9-9 of FIG. 8 showing the concentric arrangement of shell sleeve 36 surrounding coil 38B which in turn surrounds permanent magnet 40B.

The invention derives benefits from utilizing the voice coil principal in a novel actuator configuration with high force output requirements at low frequencies by using multiple flexure modules along with further advantages from utilizing only a single actuator module, providing further advantages in cost effectiveness and reliability.

The flexure stack should be constructed such that the mounting point of the armature moves linearly up and down, parallel to the central axis. The flexure stacks should provide the proper compliance, i.e. spring rate, for the moving armature portion to resonate at a specific frequency, and the maximum operating deflection should be kept within the infinite spring life limit of the material used. For aeronautical use there also is a requirement to keep the total mass of the inertial actuator as low as possible.

In the case of lateral accelerations it is possible for the moving armature mass portion to translate in relation to the fixed stator mass portion including bobbin 38 and base 32, due to the compliance of the vertical end support flexure plates 30. In order to avoid excessive motion in unwanted directions, a set of guide pins and sleeves may be installed; they should be configured and arranged to not come in contact during normal operation.

As alternatives to the flexure configuration described above with two mounting supports, one at each end of the base, the invention could be practiced with three or more mounting support flexure plates arranged in a radial array, with suitable corresponding modification of the shape of the stacked flexure strips, optionally integrated with or adapted to supplant the mounting support flexure plates.

The invention may be embodied and practiced in other specific forms without departing from the spirit and essential characteristics thereof. The present embodiments are therefore to be considered in all respects as illustrative and not restrictive, the scope of the invention being indicated by the appended claims rather than by the foregoing description; and all variations, substitutions and changes which come within the meaning and range of equivalency of the claims are therefore intended to be embraced therein.

What is claimed is:

1. An inertial actuator for converting electrical energy into mechanical vibration for active control of unwanted vibration in a host apparatus, comprising:
   a fixed base mass portion comprising (1) a generally tubular coil bobbin, (2) a primary annular electrical coil wound on said coil bobbin, and (3) a generally horizontal base, supporting said coil bobbin, made and arranged to be firmly attached to a selected region of the host apparatus for deployment therewith;

a moving armature mass portion closely surrounding said primary coil coaxially, made and arranged to produce a primary annular magnetically-charged air gap with magnetic flux path lines of force traversing said primary coil radially, such that, in accordance with rules of physics, an electrical current in said primary coil will produce a force that urges said primary coil to move in an axial direction; and a flexure structure comprising a plurality of stacks of compliant flexure strips supporting said armature mass portion from the base in a compliant manner such as to allow driven travel of the armature mass portion relative to the base mass portion in an axial direction only, while constraining said armature mass portion against radial displacement, thus enabling said armature mass portion to be vibrated axially, at a resonant frequency determined by mass of the armature mass portion and compliance of the flexure structure, in response to alternating electrical current applied to said primary coil;

a secondary annular electrical coil wound on said coil bobbin, disposed axially displaced from said primary coil toward said base;

a secondary cylindrical permanent magnet, surrounded by said coil bobbin, magnetized to have opposite magnetic poles at first and second flat end thereof, attached coaxially to the primary soft iron circular pole piece at a flat end selected so as to locate two like magnetic poles interfacing opposite sides of the primary soft iron circular pole piece;

a secondary circular soft iron pole plate whose periphery, interfacing an inner wall of the shell, creates a secondary annular magnetically-charged air gap traversing a central region of the secondary coil;

the secondary coil receiving alternating current of amplitude and phase polarity such as to interact with said primary coil in an additive manner so as to further drive said armature mass portion in vibrational travel;

said tubular coil bobbin being configured with an integral tubular portion constituting a support column extending from secondary annular electrical coil to an end configured with an inwardly extending flange by which said tubular coil bobbin is attached to said base in a manner to constitute a heat sink for said coils;

said moving armature mass portion comprising (1) a soft iron shell configured with (1A) a tubular sleeve portion disposed coaxially around the coil bobbin and (1B) a yoke plate attached to the tubular sleeve portion at an end opposite the base; and (2) a magnetic core having (2A) a primary cylindrical permanent magnet, surrounded coaxially by the coil bobbin, magnetized to have opposite magnetic poles at first and second flat ends thereof, the first flat end being attached coaxially to the yoke plate, (2B) a primary circular soft iron pole plate having a flat surface attached coaxially to the second flat end of said primary permanent magnet, and having a periphery interfacing an inner wall of the shell sleeve in a manner to create the primary annular magnetically-charged air gap traversing said primary coil, (2C) a secondary cylindrical permanent magnet, surrounded coaxially by the coil bobbin, magnetized to have opposite magnetic poles at first and second flat ends thereof, the first flat end being attached coaxially to the primary pole plate; and (2D) a secondary circular-soft iron pole plate having a flat surface attached coaxially to the second flat end of said secondary permanent magnet, and having a periphery interfacing an inner wall of the shell sleeve in a manner to create the secondary annular magnetically-charged air gap traversing said secondary coil;

said flexure structure comprising (1) a flexure stack array comprising a plurality of stacks of flexure strips disposed uniformly side by side, each stack comprising a plurality of flexure strips each having first and second ends and a central region attached to said armature mass portion via the yoke plate, and (2) a pair of end support flexure members, each comprising at least one flexure plate, disposed at corresponding opposite ends of said stack array, each having a first end attached perpendicularly to corresponding end of said stack array and a second end attached to a corresponding end of said base, made and arranged to support said stack array to said base in a manner to accommodate variations in length of said stack array due to vibrational displacement of the central region thereof;

the flexure strips in said stack array being symmetrically shaped laterally and longitudinally to have a common designated maximum width at both ends and in the mid-region and to have a common reduced width in two opposite intermediate regions between the ends and the mid-region so as to provide desired compliance and optimal stress distribution; and wherein the plurality of stacks of compliant flexure strips in the flexure stack array of said flexure structure comprises a designated quantity of like side-by-side stacks of flexure strips in a range from 3 to 7, each of said stacks comprising a designated quantity of the flexure strips in a range between 5 and 60.

2. The inertial actuator as defined in claim 1 wherein the flexure stack array comprises five like side-by-side stacks of flexure strips.

* * * * *